June 9, 1936.  F. C. BLANCHARD  2,043,947

LATHE

Filed Dec. 18, 1935  3 Sheets-Sheet 1

Inventor:
Frederick C. Blanchard
by Emery, Booth, Townsend, Miller & Neidner Attys

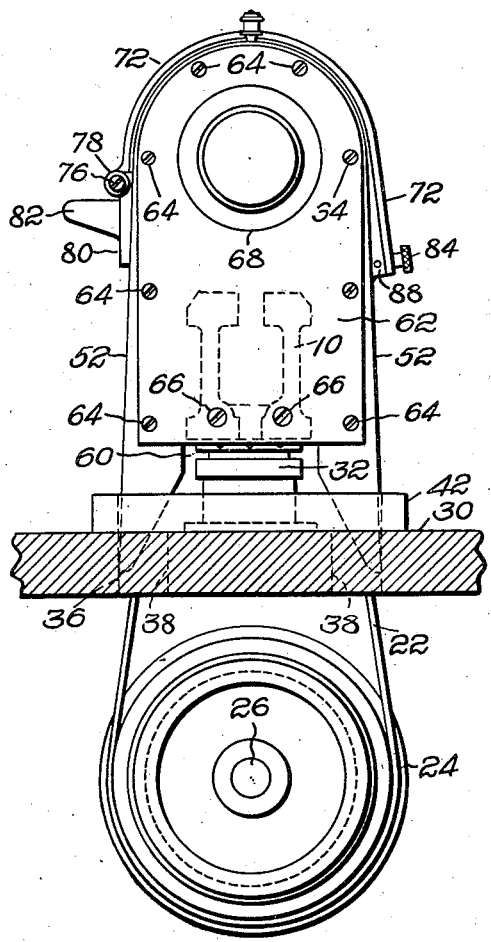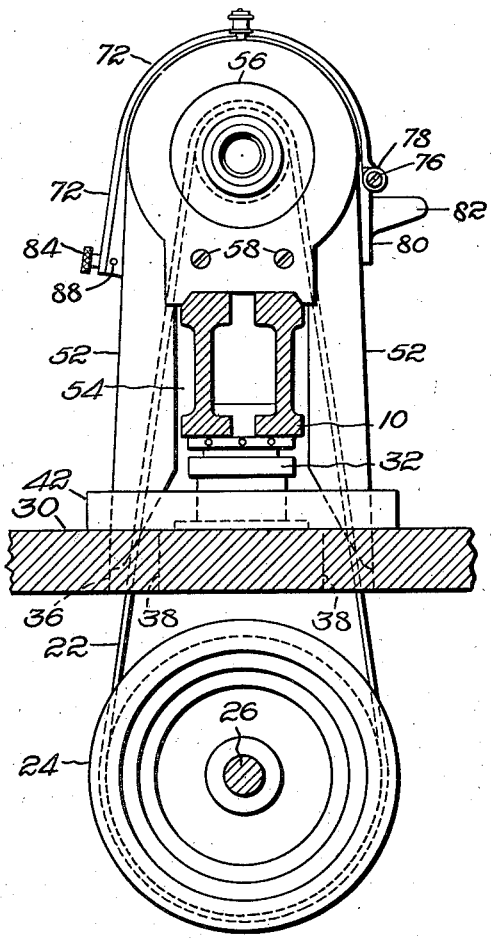

June 9, 1936.  F. C. BLANCHARD  2,043,947
LATHE
Filed Dec. 18, 1935  3 Sheets-Sheet 3

Inventor:
Frederick C. Blanchard
by Emery, Booth, Townsend, Miller & Weidner
Attys Patented June 9, 1936

2,043,947

UNITED STATES PATENT OFFICE 2,043,947

LATHE

Frederick C. Blanchard, Brookline, Mass., assignor to Rivett Lathe and Grinder, Inc., Brighton, Boston, Mass., a corporation of Massachusetts Application December 18, 1935, Serial No. 55,078

18 Claims. (Cl. 82—6)

This invention relates to lathes of the class commonly called bench lathes, and is more especially concerned with a lathe of this class having an enclosed headstock, the construction being such that, while the cone pulley of the headstock and the belt for driving it are enclosed to comply with safety requirements, nevertheless, the utility of the lathe is in no wise impaired, and the enclosure is no bar to the use and replacement of an endless belt. A hinged cover over the cone pulley permits ready access to the latter and to the belt, and a removable end plate, in conjunction with a U-shaped guard and slot in the bench or cabinet top or oil pan permits replacement of endless, flat or V driving belts without disassembling the headstock spindle or any of the driving mechanism. Other advantages are indexing of the work by means of index holes in the cone pulley, the placing of the hand on the cone pulley to turn the spindle, and, in fact, the performance of any of the various functions, of which an open head bench lathe is capable.

The invention will best be understood by reference to the following description when taken in connection with the accompanying drawings of one specific embodiment thereof, while its scope will be pointed out more particularly in the appended claims.

In the drawings:

Fig. 3 is a vertical, cross-sectional view on line 3—3 of Fig. 2;

Fig. 4 is a vertical, cross-sectional view on line 4—4 of Fig. 2;

Figure 1:
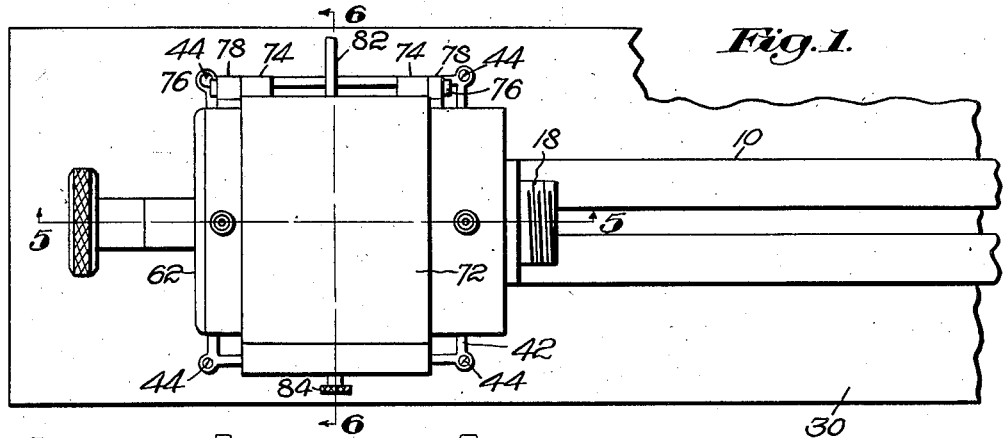
Fig. 1 is a plan of a portion of a bench lathe embodying the invention.

Referring to the drawings and to the embodiment of the invention illustrated therein by way of example, there is shown a lathe comprising a bed 10 (see Fig. 5) on which is mounted a headstock 12 provided with bearings 14 and 16 for a spindle 18 to which is secured a cone pulley 20 connected by an endless belt 22 to a cone pulley 24 which is secured to the outer end of a shaft 26 projecting from a speed box 28 (see Fig. 2) having the sole bearings for the shaft. As the pulley 24 is what may be called an overhanging pulley, the belt may be removed intact from the pulley 24 at the outer end of the latter. In some installations, one or more V belts and corresponding V pulleys are substituted for the ones shown.

The bed 10 is mounted on a support herein exemplified by a bench 30 which, in some cases, is the top of a cabinet, and in other cases is what is called a pan. Herein, vertically adjustable pedestals, one of which is shown at 32 between the bed 10 and the bench 30, support the former on the latter and provide for adjustment of the belt tension by moving the bed vertically. In this example, the speed box 28 is secured to and supported by the bottom of the bench or pan 30.

To enable an endless or jointless belt to be employed, and to provide for the quick installation and removal of the same, the bench or pan 30 is provided with a single opening 36 through which both leads of the belt extend, thereby to permit removal and replacement of the belt to be accomplished by passing the belt bodily and intact through the opening. As herein shown, this opening is a U-shaped slot having longitudinal portions 38 through which the belt leads extend, and a transverse portion 40 connecting the longitudinal portions. About the U-shaped slot 36 is a correspondingly shaped belt guard 42 which, in the case of a wooden bench, is secured as by screws 44 to the top of the bench 30. In the case of a cast metal pan sometimes used, the guard is integral with the pan.

As herein shown, that portion of the bench which is between the longitudinal portions 38 of the slot 36 supports the pedestal 32 and the latter is in the direct line of the pull of the belt so that there is no tendency to deflect the bed 10. To strengthen the bench at this point so that there shall be no deflection of the bench, there is provided an underlying brace 46 spanning the longitudinal portions of the slot 36, and suitably secured in place as by bolts 48. To facilitate removal of this brace, as a preliminary to removal and replacement of the belt, the brace is provided with slots 50 through which the bolts 48 extend. Accordingly, removal of the brace can be accomplished by simply loosening the bolts without removing them. The mode of installing and replacing the belt will be described hereinafter.

Figure 2:
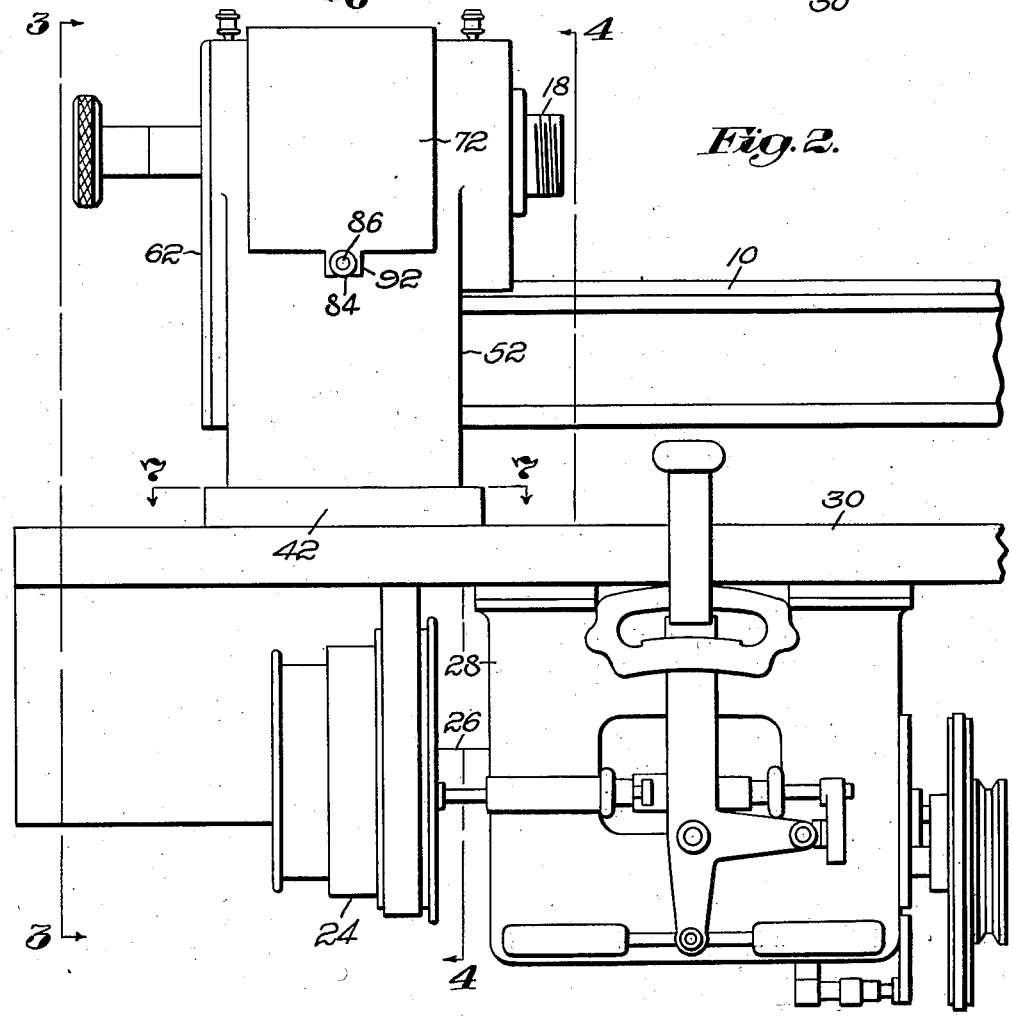
Fig. 2 is a front elevation of the same.

The headstock, pulley and belt enclosure will now be described, reference being had at first to Figs. 1 and 2. The principal part of the enclosure is a hood 52 whose form is such that it may be dropped down and about the headstock and about that part of the bed which supports the headstock. To this end, the hood is open at the bottom, and at one end (see Fig. 4) it has a vertical slot 54 slightly wider than the bed 10. The same end is provided with an opening 56, herein circular, to receive the bearing hub 16 (see Fig. 5). This end of the hood is suitably secured, as by screws 58, threaded into the headstock 12.

The other end of the hood is provided with a large opening 60, the major portion of which is closed by a plate 62 secured to the hood as by screws 64 and to the adjacent end of the lathe bed 10 as by screws 66. This plate is provided with an opening 68, herein circular, to receive the bearing hub 14. As herein shown, the hood extends loosely into and telescopes with the U guard 42 and the U slot 36, and there is a sufficient clearance to permit the hood to move freely in a vertical direction when the pedestal 32 is adjusted to vary the belt tension. There is sufficient space below the plate 62 at one end and below the bed 10 at the other end of the hood to permit access to the pedestal 32.

The hood 52 is provided at its upper portion with an opening 70 (see Figs. 5 and 6) the size and shape of which is ample to permit access to the pulley 20 and the belt 22, to permit the pulley and the spindle to be turned by hand and to permit the belt to be shifted on the cone pulleys 20 and 24, as well as to facilitate handling of the belt during installation and removal and replacement of the latter when worn or stretched to too great an extent. The opening 70 is normally covered by a cover 72 which, in the present example, is hinged at the rear as by being provided with two ears 74 (see Fig. 1) which turn loosely on two studs 76 threaded into two ears 78 presented by a bracket 80 (see Figs. 3 and 4) secured to the back of the hood 52 and provided with a lug 82 to limit rearward and downward movement of the cover. The cover is suitably secured in its normal position as by a knurled nut 84 (see Fig. 6) threaded onto a screw 86 mounted to swing on a pivot 88 on the hood 52 into and out of a slot 90 in a lug 92 projecting downwardly from the lower, front edge of the cover 72. By slightly loosening the nut 84, the screw 86 may be swung downwardly out of the slot 90, and the cover 72 is then free to be swung upwardly and rearwardly until it strikes the lug 82 at the rear. The pulley 20 and the upper portion of the belt 22 are now exposed for manipulation.

Figure 5:
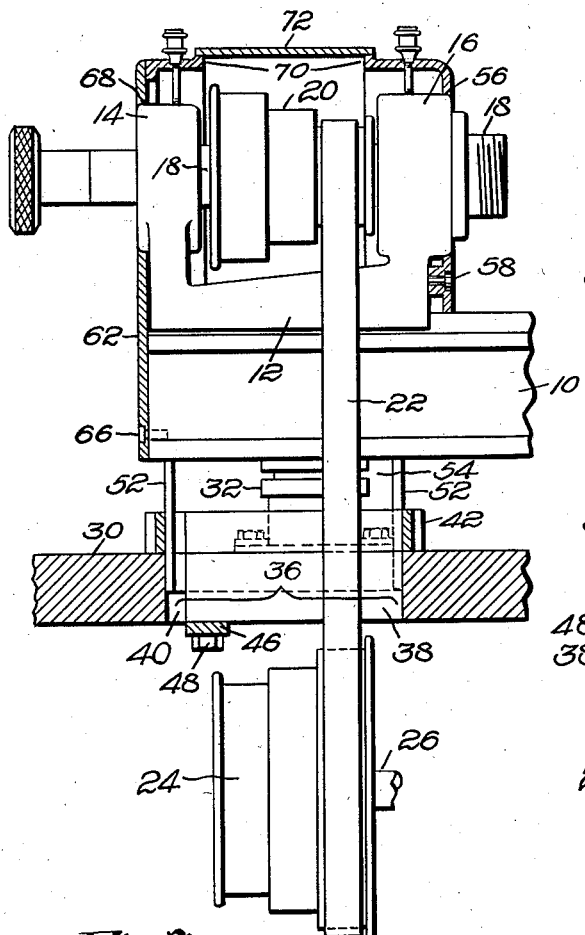
Fig. 5 is a vertical, longitudinal sectional view on line 5—5 of Fig. 1.
Figure 6:
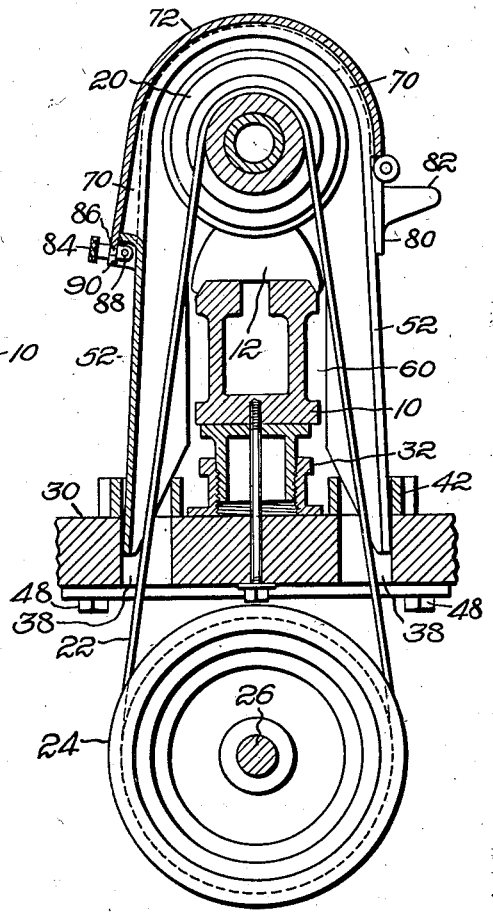
Fig. 6 is a vertical, cross-sectional view on line 6—6 of Fig. 1.
Figure 7:
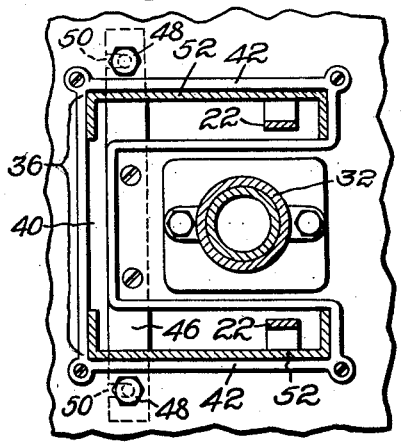
Fig. 7 is a horizontal sectional view on line 7—7 of Fig. 2.

From an examination of Figs. 5 and 6, it will be observed that the bed 10 and the base of the headstock are between the leads of the belt 22 and that, by first removing the cover plate 62 and the brace 46, and swinging back the cover 72, the lower part of the belt may be slipped off the lower pulley 24, after which one lead may be passed through the transverse portion 40 of the U slot 36 into one of the longitudinal portions 38. Then, by grasping the upper portion of the belt through the upper opening 70, the belt may be lifted and passed lengthwise of the pulley 20 and over the bearing 14 and thence through the end opening 60 of the hood 52. A new belt may be installed by a reversal of this operation, after which the cover plate 62 and brace 46 are replaced and the top cover 72 is closed.

The spindle bearings, designated generally by the numerals 14 and 16, are sometimes, as in this example, of the roller type, in which case they are readily adjustable through the openings 56 and 68 which expose the outer ends of the respective bearings, thus avoiding the necessity of removing the cover plate 62 and the hood 52 to which it is attached.

Having thus described one embodiment of the invention but without limiting myself thereto, what I claim and desire, by Letters Patent, to secure is:

1. In a lathe, the combination of a bed, a headstock supported by said bed, a spindle supported by said headstock, a pulley secured to said spindle, a second pulley below said bed, a belt connecting said pulleys and having its leads extending across the front and rear, respectively, of said headstock and said bed, and an enclosure about said headstock, about the first-mentioned pulley and about the upper portions of said belt leads.

2. In a lathe, the combination of a bed, a headstock supported by said bed, a spindle supported by said headstock, a pulley secured to said spindle, a second pulley below said bed, a belt connecting said pulleys and having its leads extending across the front and rear, respectively, of said headstock and said bed, and an enclosure about said headstock, about the first-mentioned pulleys and about the upper portions of said belt leads, said enclosure including a hood provided with an opening affording access to the first mentioned pulley and to the upper portion of said belt, and a cover for said opening.

3. In a lathe, the combination of a bed, a headstock supported by said bed, a spindle supported by said headstock, a pulley secured to said spindle, a second pulley below said bed, a belt connecting said pulleys and having its leads extending across the front and rear, respectively, of said headstock and said bed, and an enclosure about said headstock, about the first-mentioned pulley and about the upper portions of said belt leads, said enclosure including a hood provided with an opening affording access to the first mentioned pulley and to the upper portion of said belt, and a cover hinged to said hood and adapted to swing upwardly and rearwardly to expose said opening.

4. In a lathe, the combination of a bed, a headstock supported by said bed, a spindle supported by said headstock, a pulley secured to said spindle, a second pulley below said bed, a belt connecting said pulleys and having its leads extending across the front and rear, respectively, of said headstock and said bed, and an enclosure about said headstock, about the first-mentioned pulley and about the upper portions of said belt leads, said enclosure including a hood provided with an opening affording access to the first mentioned pulley and to the upper portion of said belt, a cover hinged to said hood to swing upwardly and rearwardly to expose said opening, and means to secure said cover in place over said opening.

5. In a lathe, the combination of a bed, a headstock supported by said bed, a spindle supported by said headstock, a pulley secured to said spindle, a second pulley below said bed, a belt connecting said pulleys and having its leads extending across the front and rear, respectively, of said headstock and said bed, and an enclosure about said headstock, about the first-mentioned pulley and about the upper portions of said belt leads, said enclosure including a hood provided with an opening affording access to the first mentioned pulley and to the upper portion of said belt, a cover hinged to said hood to swing upwardly and rearwardly to expose said opening, a stop to limit the opening movement of said cover, and means to secure said cover in place over said opening.

6. In a lathe, the combination of a bed, a headstock supported by said bed, a spindle supported by said headstock, a pulley secured to said spindle, a bench below and supporting said bed, a second pulley below said bench, a belt connecting said pulleys and having its leads extending across the front and rear, respectively, of said headstock and said bed and through said bench, and an enclosure about said headstock, about the first-mentioned pulley and about those portions of said belt which are above said bench.

7. In a lathe, the combination of a bed, a headstock supported by said bed, a spindle supported by said headstock, a pulley secured to said spindle, a bench below and supporting said bed, said bench being provided with an opening, a belt guard about said opening, a second pulley below said bench, a belt connecting said pulleys and having its leads extending across the front and back, respectively, of said headstock and said bed and through said opening and said belt guard, and an enclosure about said headstock, about the first-mentioned pulley and about those portions of said belt which are above said belt guard, said enclosure telescoping with said belt guard.

8. In a lathe, the combination of a bed, a headstock supported by said bed and having spaced bearings, a spindle supported by said bearings, a spindle pulley between said bearings and secured to said spindle, a belt wrapped about the upper portion of said pulley and having front and rear leads which extend from said pulley downwardly at the front and rear, respectively, of said headstock and bed, a driving pulley about whose lower portion said belt is wrapped, an enclosure about said headstock, about a portion of said bed and about portions of said belt leads, said enclosure being provided with an opening to render the upper portion of said belt and said spindle pulley accessible, and being provided also with an end opening to render said belt accessible for removal through the space between said headstock and bed on the one hand and said enclosure on the other hand and without disassembling said spindle from said bearings, and covers for said openings.

9. In a lathe, the combination of a bed, a headstock supported by said bed and having spaced spindle bearings, a pulley between said bearings and secured to said spindle, a shaft below said bed, a support which supports said shaft with one end of the latter projecting beyond and unsupported by said support, a pulley secured to the unsupported end of said shaft, an endless belt connecting said pulley and having its leads disposed, one in front and the other in back of said headstock and said head, a bench between said bed and said support and provided with a single opening through which said leads extend, a belt guard above and secured to said bench about said opening, vertically adjustable pedestals which support said bed on said bench, a housing which telescopes with said belt guard and extends upwardly therefrom and is secured to said headstock to move vertically with the latter and with said bed under the influence of said pedestals, said housing being provided with an opening to expose said pulley which is secured to said spindle, said housing being provided also with an end opening through which said belt may be withdrawn when it is removed from said pulleys and without disassembling said spindle from said bearings, a cover which normally closes the first-mentioned opening of said housing, and a cover which normally closes said end opening.

10. An enclosure for the headstock, spindle pulley, a portion of the spindle pulley driving belt, and a portion of the bed of a lathe, the same comprising a housing having a bottom opening for the passage of the belt, a top opening for access to the pulley and the belt, an opening in one end for the bed, an opening in the same end for the spindle, and an opening in the other end for the removal of the belt, a cover for said top opening, and a cover for said opening for the removal of the belt.

11. An enclosure for the headstock, spindle pulley, a portion of the spindle pulley driving belt, and a portion of the bed of a lathe, the same comprising a housing having a bottom opening for the passage of the belt, a top opening for access to the pulley and the belt, an opening in one end for the bed, an opening in the same end for the spindle, and an opening in the other end for the removal of the belt, a cover for said top opening, and a cover for said opening for the removal of the belt, the last-mentioned cover being provided with an opening for the spindle.

12. An enclosure for the headstock, spindle pulley, a portion of the spindle pulley driving belt, and a portion of the bed of a lathe, the same comprising a housing having a bottom opening for the passage of the belt, a top opening for access to the pulley and the belt, a cover for said top opening, said cover being hinged at the rear to swing upwardly and rearwardly to expose the pulley and belt, and a cover for said opening for the removal of the belt.

13. An enclosure for the headstock, spindle pulley, a portion of the spindle pulley driving belt, and a portion of the bed of a lathe, the same comprising a hood open at the bottom and at the lower portion of one end so that it may be dropped down and about the headstock and about that part of the bed which supports the headstock.

14. An enclosure for the headstock, spindle pulley, a portion of the spindle pulley driving belt, and a portion of the bed of a lathe, the same comprising a hood open at the bottom and at the lower portions of one end so that it may be dropped down and about the headstock and about that part of the bed which supports the headstock, said hood having an opening in said end for the spindle and an opening in the opposite end for the removal of the belt, and a cover for the last-mentioned opening, said cover being provided with an opening for the spindle.

15. In a lathe, the combination of a bed, a headstock comprising two bearings and a connecting portion below said bearings, a spindle supported by said bearings, a pulley secured to said spindle between said bearings and above said connecting portion, a second pulley below said bed, a belt connecting said pulleys and having its leads extending across the front and rear, respectively, of said connecting portion and said bed, and an enclosure about said headstock, about the first-mentioned pulley and about the upper portions of said belt leads.

16. In a lathe, the combination of a bed, a headstock supported by said bed, a spindle supported by said headstock, a pulley secured to said spindle, a second pulley below said bed, a belt connecting said pulleys and having its leads exterior to said headstock and said bed and extending across the front and rear, respectively, of said headstock and said bed, and an enclosure distinct from, extraneous to, and disposed about said headstock, about the first-mentioned pulley and about the upper portions of said belt leads.

17. In a lathe, the combination of a bed, a headstock supported by said bed, a spindle supported by said headstock, a pulley secured to said spindle, a second pulley below said bed, a belt connecting said pulleys and having its leads exterior to said headstock and said bed and extending across the front and rear, respectively, of said headstock and said bed, and an enclosure distinct from, extraneous to, and disposed about a portion of said bed, about the first-mentioned pulley and about the upper portions of said belt leads.

18. In a lathe, the combination of a bed, a headstock supported by said bed, a spindle supported by said headstock, a pulley secured to said spindle, a second pulley below said bed, a belt connecting said pulleys and having its leads extending across the front and rear, respectively, of said headstock and said bed, and an enclosure about said headstock, about the first-mentioned pulley and about the upper portions of said belt leads, there being spaces between the front and rear of said headstock and said bed, on the one hand, and the front and rear of said enclosure, on the other hand, and portions of said belt leads being disposed in said spaces, respectively.

FREDERICK C. BLANCHARD.